United States Patent [19]

Theis

[11] Patent Number: 5,509,267
[45] Date of Patent: Apr. 23, 1996

[54] AUTOMOTIVE VEHICLE CATALYST DIAGNOSTIC

[75] Inventor: Joseph R. Theis, Grand Blanc, Mich.

[73] Assignee: General Motors Corporation, Detroit, Mich.

[21] Appl. No.: 337,703

[22] Filed: Nov. 14, 1994

[51] Int. Cl.⁶ .................................................. F01N 3/20
[52] U.S. Cl. ................................ 60/274; 60/276; 60/277; 60/285
[58] Field of Search ........................... 60/274, 276, 277, 60/285

[56] References Cited

U.S. PATENT DOCUMENTS

| | | | |
|---|---|---|---|
| 5,099,647 | 3/1992 | Hamburg | 60/285 |
| 5,127,225 | 7/1992 | Nada | 60/285 |
| 5,159,810 | 11/1992 | Grutter | 60/285 |
| 5,426,934 | 6/1995 | Hunt | 60/277 |

*Primary Examiner*—Douglas Hart
*Attorney, Agent, or Firm*—Michael J. Bridges

[57] ABSTRACT

A catalytic treatment device diagnostic for an automotive exhaust system having at least two catalytic treatment devices wherein reduced oxygen storage capacity of each of the devices may be diagnosed without significant loss in engine air/fuel ratio control precision by varying the source of an actual air/fuel ratio feedback signal from a sensor positioned upstream of the devices during normal operation to a sensor mounted downstream of at least one of the devices during a diagnostic period. Measurable change in the oxygen content of exhaust gas passing through each of such devices then becomes available for analysis during the diagnostic period.

13 Claims, 5 Drawing Sheets

AUTOMOTIVE VEHICLE CATALYST DIAGNOSTIC

FIELD OF THE INVENTION

This invention relates to automotive vehicle diagnostics and, more specifically, to monitoring the performance of automotive engine exhaust gas treatment devices.

BACKGROUND OF THE INVENTION

Effective treatment of internal combustion engine emissions can be provided through catalytic treatment of such emissions by a catalyst disposed in a conventional catalytic converter. The catalyst temperature must be elevated above light-off to support such activity. The heat energy present in engine exhaust gas provides for such heating. Following an engine coldstart, a typical catalytic converter in a vehicle underfloor position (underfloor converter) may require more than sixty seconds of energy transfer from the engine exhaust gas to reach light-off. Prior to reaching light-off, the effectiveness of the converter is substantially limited.

To provide for some catalytic treatment of the engine exhaust gas prior to the time the conventional underfloor converter reaches light-off, small warm-up "pup" catalytic converters have been proposed. Such pup converters may be positioned in an internal combustion engine exhaust gas path very close to the engine exhaust manifold, to minimize loss of heat energy between the engine and the converter and thus to maximize heat energy transfer to the pup converter. The pup converter and the catalyst contained therein are both of significantly smaller volume than the conventional converter. The location and size of the pup converter thus contribute to a significantly shorter light-off time than that of conventional converters. Following light-off, the pup may contribute some catalytic treatment to the engine exhaust gas, to reduce vehicle emissions following a coldstart of the engine. After the conventional catalytic converter reaches light-off, it takes on the majority of exhaust gas catalytic treatment.

To sustain an acceptable degree of catalytic treatment performance, it has been proposed to place a conventional oxygen sensing device, traditionally used for closed-loop engine air/fuel ratio control, in the engine exhaust gas path in a position downstream of the conventional catalytic converter, to monitor and report the oxygen storage capacity of the converter. In the event such capacity is determined to be diminished, indicating that the converter may not be adequately treating engine exhaust gas, the vehicle operator may be notified so that the converter may be repaired or replaced.

The diagnostic approach using an oxygen sensor downstream of the conventional catalytic converter may be extended to monitor the pup converter by placing an additional conventional oxygen sensor between the pup converter and the conventional catalytic converter to monitor the oxygen storage capacity of the pup converter. In its more traditional automotive role, the oxygen sensor would also be placed upstream of the both the pup and the conventional converters to monitor the oxygen content in the engine exhaust gas as a measure of the actual engine air/fuel ratio. An output signal from this upstream sensor would be available for comparison to a desired engine air/fuel ratio and a controlled correction to commanded air or fuel to the engine made in response to the comparison.

Limitations arise in a sensor arrangement in which three oxygen sensors are provided in the engine exhaust gas path including a first sensor between the engine and the pup converter for engine air/fuel ratio control, a second sensor between the pup and conventional converter for pup converter diagnostics, and a third sensor downstream of the conventional converter for converter diagnostics. Specifically, the first sensor output voltage will oscillate between a rich and lean voltage responsive to normal closed-loop engine control activity. The second sensor output voltage will, due to the oxygen storage capacity of a "healthy" pup converter, oscillate very little, remaining at a substantially steady value. The third sensor output voltage will likewise appear as a substantially steady value with very little oscillation. While the inactivity of the second signal indicates normal oxygen storage capacity in the pup converter, and thus may be used for comparison to the first signal to diagnose the pup converter, the insignificant change in sensor output signal between the second and third sensors provides virtually no measure of the oxygen storage capacity of the conventional converter.

Furthermore, it is desirable to locate the pup converter as close to the engine as possible to maximize heat transfer to the catalyst thereof. Such proximity to the engine leaves little room for locating an oxygen sensor between the pup converter and the engine for traditional engine air/fuel ratio control. Furthermore, if room is found for location of that oxygen sensor upstream of the pup converter, it may be positioned so as to provide a poor indication of overall engine air/fuel ratio. For example, if the sensor is located in or closer to an exhaust manifold of one bank of an engine having a plurality of cylinder banks, or is located so close to the engine that proper mixing of individual cylinder exhaust has not yet occurred, the accuracy of the sensor in indicating overall engine air/fuel ratio may be decreased, leading to loss of air/fuel ratio control accuracy.

It would therefore be desirable to provide for monitoring of both the pup and conventional catalytic converters while providing for precise engine air/fuel ratio control.

SUMMARY OF THE INVENTION

The present invention provides the desired monitoring and control in an engine and emissions control system for an automotive vehicle having three oxygen sensors and both a pup and a conventional catalytic converter by controlling the engine air/fuel ratio, at least during converter diagnostic periods, using an oxygen sensor disposed between the pup and conventional catalytic converters for feedback on actual engine air/fuel ratio.

More specifically, during an engine operating period in which analysis of the oxygen storage capacity of the conventional catalytic converter is desired, engine closed-loop air/fuel ratio control is made responsive to feedback from an "intermediate" oxygen sensor positioned between the pup and conventional catalytic converters in the engine exhaust gas path. During other operating periods, the engine control may continue to be responsive to such intermediate oxygen sensor, or may respond to feedback from an "upstream" sensor located upstream of the pup converter.

The closed-loop control activity responsive to the intermediate oxygen sensor will provide for a significant oscillation of the output signal of such sensor between signal ranges corresponding to rich and lean engine air/fuel ratios. An oscillation frequency may then be measured or estimated and used to diagnose the pup converter oxygen storage capacity. The oxygen storage activity of a "healthy" conventional underfloor converter will significantly dampen the variation in oxygen content of the engine exhaust gas passing through the conventional converter, such that a "downstream" oxygen sensor positioned downstream of the underfloor converter in the engine exhaust gas path will produce an output signal having very little voltage oscillation. The degree of attenuation of the downstream sensor output signal or a comparison of the output of the intermediate and downstream sensors may provide information on the oxygen storage capacity of the underfloor converter.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
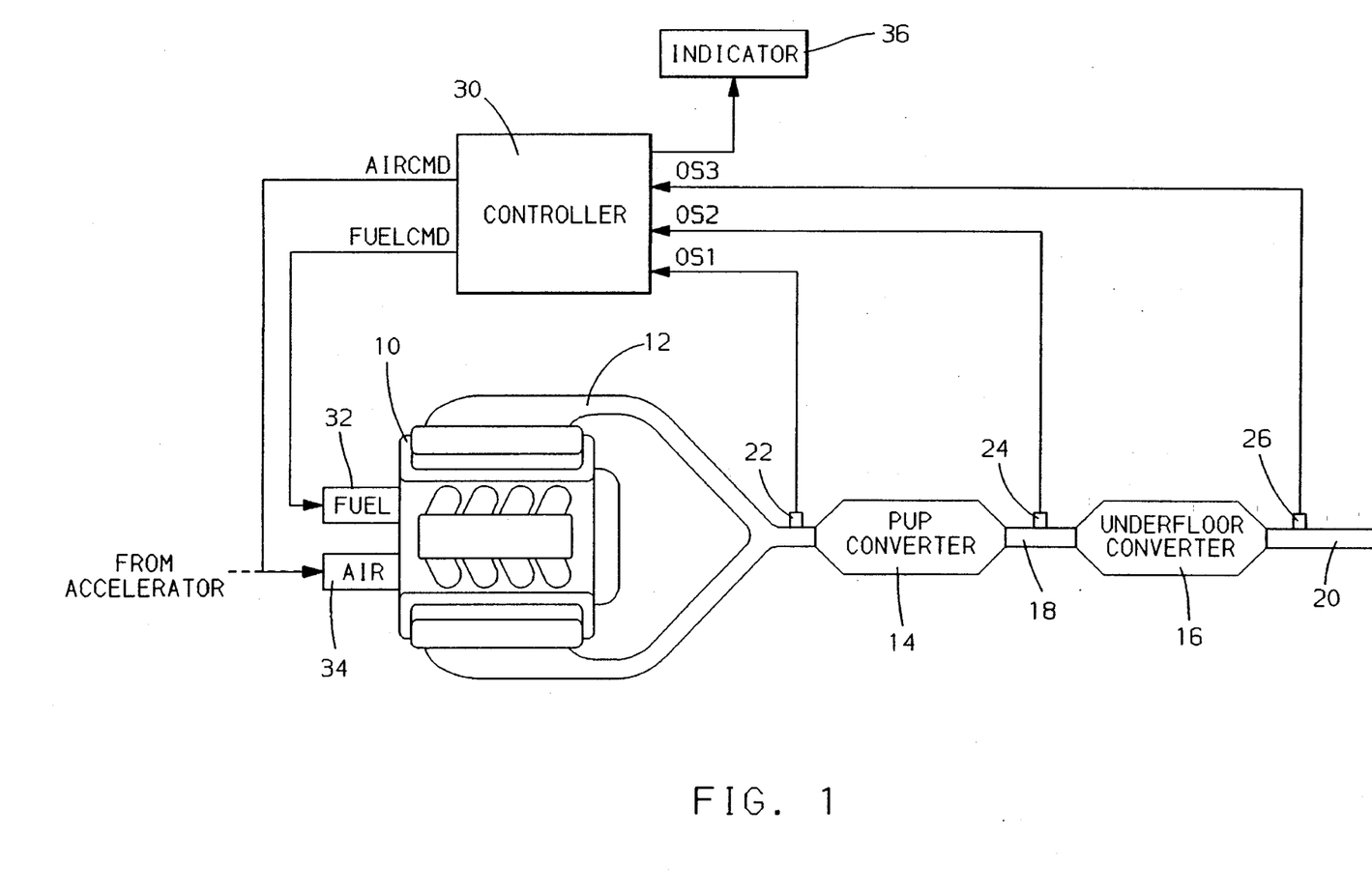
FIG. 1 is a general diagram of the engine and emissions control hardware used to carry out the preferred embodiment of this invention.

Referring to FIG. 1, an internal combustion engine 10 generates exhaust gas through combustion operations therein, the exhaust gas exiting engine cylinders and passing through exhaust gas conduit 12 to conventional PUP converter 14 for catalytic treatment therein. The catalytically treated exhaust gas passes from PUP converter 14 through exhaust gas conduit 18 to conventional underfloor converter 16 for additional catalytic treatment therein. The exhaust gas, having been treated by the PUP and underfloor converters, is passed out of the engine exhaust system via conduit 20.

PUP converter 14 may take the form of a conventional three-way catalytic converter of relatively small volume, such as approximately 32 cubic inches, having a conventional catalyst containing cerium, and containing approximately 75 grams per cubic foot of palladium. Underfloor converter 16 may take the form of a conventional three-way catalytic converter having a catalyst containing cerium. Three exhaust gas oxygen sensors are disposed in the exhaust system of FIG. 1, to provide feedback information for engine air/fuel ratio control and to provide for catalytic converter diagnostics in accord with this invention. A first oxygen sensor 22 designated as an "upstream" oxygen sensor due to its position upstream in the engine exhaust gas flow path of the catalytic converters 14 and 16 of the present embodiment, provides an output signal OS1 indicative of the oxygen content in engine exhaust gas flowing by the sensor 22 and prior to treatment by PUP converter 14. Engine exhaust gas passing through PUP converter 14 for catalytic treatment therein will then pass by oxygen sensor 24, designated as an "intermediate" oxygen sensor due to its position intermediate the converters 14 and 16 of the present embodiment. The intermediate oxygen sensor 24 is disposed in exhaust gas conduit 18 to sense the oxygen content of the exhaust gas passing thereby after treatment of such exhaust gas by the pup converter 14. Sensor 24 provides output signal OS2 indicating such oxygen content. Oxygen sensor 26 is designated as "downstream" oxygen sensor due to its position in the engine exhaust gas flow path downstream of the catalytic converters 14 and 16 of this embodiment, and senses the oxygen content of engine exhaust gas following treatment thereof by both converters 14 and 16. Sensor 26 provides output signal OS3 indicating such oxygen content. The oxygen sensors 22, 24, and 26 may be of a conventional zirconium oxide $ZrO_2$ design generally known in the art to provide a high gain signal indicating oxygen content of the gas passing thereby. For example, such oxygen sensors have an output signal characterized by an S-curve including a substantially linear, very high gain region extending between a rich and a lean region. The sensor output signal voltage tends to switch rapidly between the rich and lean regions along the high gain portion of the S-curve through the activity of the engine air/fuel ratio control of driving the actual air/fuel ratio toward a stoichiometric ratio, which corresponds substantially to a center portion of the S-curve between the rich and lean regions. Efficient catalytic treatment of engine exhaust gas elements including hydrocarbons HC, carbon monoxide CO, and oxides of nitrogen $NO_x$ can be provided when the actual air/fuel ratio is at stoichiometry. Furthermore, oxygen sensors 22, 24, and 26 may include electrical heating elements disposed on or near the oxygen sensors, and energized through a control signal issued by controller 30 following an engine cold start, wherein the control signal operates to drive such heating elements to emit heat energy for heating of the oxygen sensor corresponding thereto. Such supplemental heating decreases the amount of time required to heat the oxygen sensors to a temperature supporting accurate oxygen sensing, and are generally commercially available.

The output signals OS1, OS2 and OS3 are provided to a conventional controller 30 which may include a single chip micro-controller having such elements as a central processing unit, volatile and non-volatile memory units, an input/output unit, and other units generally known to be associated with conventional automotive controllers.

Through the operation of the controller 30, such as through the execution of a series of control functions stored in controller non-volatile memory, the controller provides for engine control, diagnostic and maintenance functions as is generally understood in the art. In this embodiment, the controller provides for such functions, as well as for closed-loop engine air/fuel ratio control responsive to an oxygen sensor output signal, wherein an actual engine air/fuel ratio as indicated by such oxygen sensor output signal is driven toward a desired engine air/fuel ratio, such as the stoichiometric air/fuel ratio, through modulation through a fuel command FUELCMD issued to a fuel control module 32, or an air command AIRCMD issued to an air control module 34 to modulate the air and fuel admitted to engine 10 so as to drive such actual air/fuel ratio toward such desired air/fuel ratio in a controlled manner. Alternatively, control of the air quantity admitted to engine 10 may be manually provided through an engine operator displacement of an accelerator pedal which is mechanically linked to an inlet air valve of the engine, wherein the displacement of the valve away from a substantially closed position corresponds to the degree of manual displacement of the accelerator pedal away from a rest position. Additionally in this embodiment, controller 30 provides diagnostic functions for various engine components including but not limited to diagnostics of PUP converter oxygen storage capacity, and underfloor converter 16 oxygen storage capacity. Such oxygen storage capacity has been suggested to indicate the capacity of catalytic converters to catalytically treat the engine exhaust gas elements of NOx, CO, and HC, and may be used to diagnose a converter that needs repair or replacement.

The fuel control unit 32 may include conventional control hardware that responds to a control command FUELCMD from controller 30 and issues timed fuel pulse width drive signals to each of a plurality of fuel injector drivers (not shown) used to drive a corresponding plurality of conventional fuel injectors to deliver fuel pulses to engine cylinders. The air control unit 34 may include an electronic throttle control unit which includes a controller for positioning an actuator used to drive the engine inlet air valve to a position corresponding to a desired inlet air rate, or may include a driver for driving a bypass valve used to bypass a throttle valve to adjust inlet air rate to the engine 10 in accord with engine air/fuel ratio control requirements.

Upon diagnosing a fault condition in certain of the engine components, such as a low oxygen storage capacity condition in the PUP converter 14 or the underfloor converter 16 corresponding to a converter of diminished catalytic treatment capacity in accord with this invention, controller 30 may issue an excitation command to indicator 36 to notify a vehicle operator or a service technician of the diagnosed fault condition. The indicator may include a warning lamp on vehicle instrument panel. Upon indicating the fault condition via indicator 36, the controller 30 may store a fault code identifying the nature of the fault in controller nonvolatile memory, for use by the vehicle operator or service technician in fault identification and treatment.

Figure 2A:
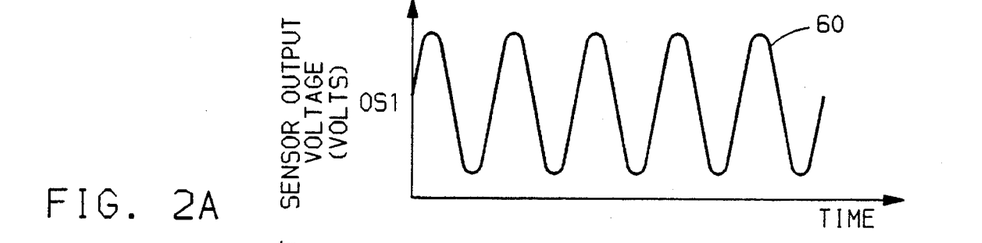
FIGS. 2–5 are diagrams illustrating oxygen sensor output signals from oxygen sensors of FIG. 1.
Figure 2B:
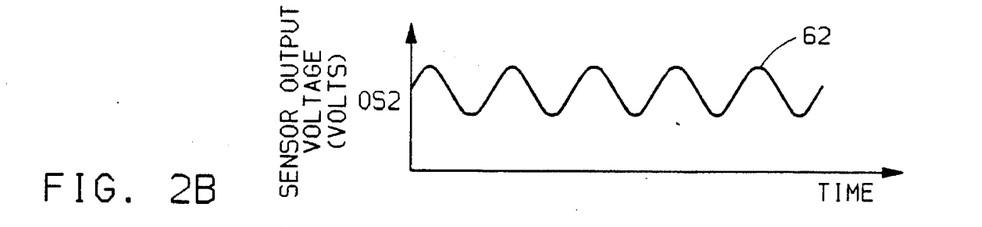
Figure 2C:
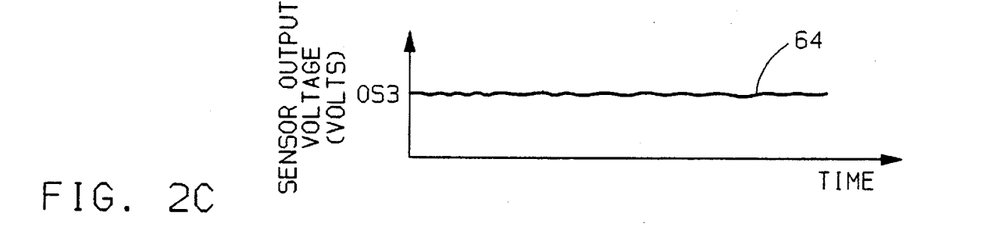

In this embodiment, the signals OS1, OS2, and OS3 provide control and diagnostics information. For example, FIG. 2 illustrates sensor output voltage values for OS1, OS2, and OS3 in a control approach in which signal OS2 is provided as a feedback measure of actual air/fuel ratio for use in closed-loop engine air/fuel ratio control. The signals illustrated in FIG. 2 represent substantially contemporaneous measurements by oxygen sensors 22, 24 and 26 under common engine operating conditions. Output signal OS1 60 from the upstream oxygen sensor 22 of FIG. 1 oscillates between a high voltage level and a low voltage level substantially along the high gain portion of its characteristic "S" curve. Sensor output voltage signal OS2 62 of FIG. 2 represents the output signal of sensor 24 of FIG. 1 when such signal is relied on by a closed-loop air/fuel ratio control as a measure of actual engine air/fuel ratio. Generally, the signal OS2 oscillates between a rich and lean condition substantially at the frequency of signal OS1 60, but at a lower frequency than if the signal OS1 was used for feedback of actual air/fuel ratio for closed-loop engine air/fuel ratio control. The measured or estimated frequency of oscillation of signal OS2 may be used as a measure of the oxygen storage and release capacity of the catalyst of pup converter 14, as will be described.

Signal OS3 64 of FIG. 2, corresponding to the output voltage of oxygen sensor 26 of FIG. 1, is highly attenuated over that of signals OS1 and OS2 for approximately the same engine operating conditions, due to the significant oxygen storage and release activity of the underfloor converter 16 of FIG. 1, which significantly attenuates rich or lean oxygen conditions in the engine exhaust gas passing through the converter 16, as is generally understood in the art. The oxygen storage and release capacity of underfloor converter 16 may thus be monitored by analyzing the difference between the OS2 and OS3 signals, as will be described.

Figure 3A:
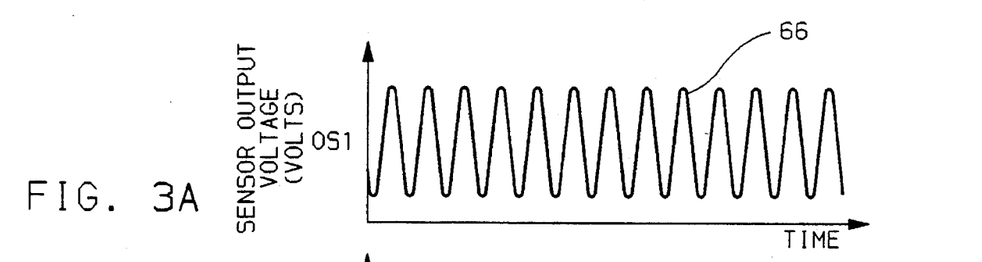
Figures 3B, 3C:
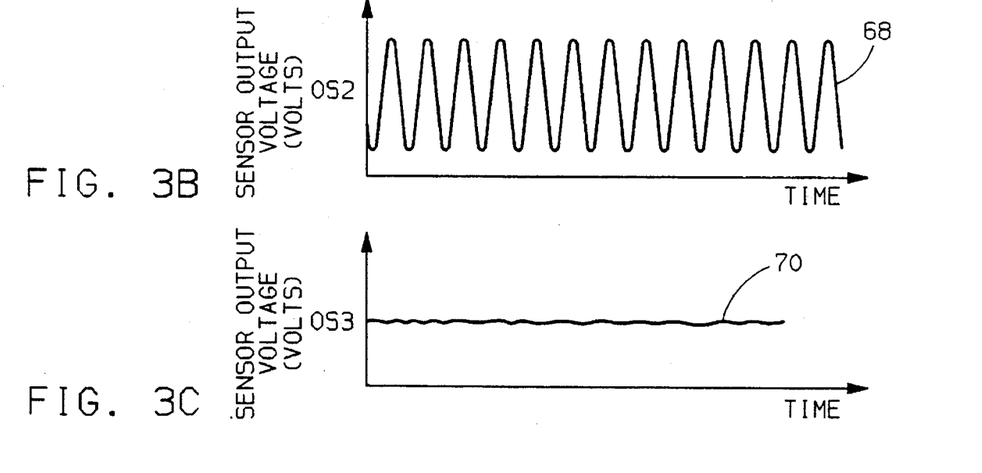

FIG. 3 diagrams signals OS1, OS2, and OS3 under an operating condition in which the PUP converter is defective, having a depleted oxygen storage capacity. As in the case of FIG. 2, the signals of FIG. 3 represent the output signals of sensors 22, 24, and 26 taken during substantially contemporaneous measurement periods with signal OS2 used for closed-loop engine air/fuel ratio control. Signal OS1 66 is oscillating rapidly between its rich and lean conditions corresponding to the activity of the closed-loop air/fuel ratio control, and signal OS2 68 is following closely the signal OS1 66 due to an absence of significant oxygen storage and release activity in PUP converter 14 of FIG. 1. The rapid frequency of oscillation, such as compared to that of signals 60 and 62 of FIG. 2 may be used to diagnose the defective pup converter 14 of FIG. 1. The signal OS3 70 of FIG. 3 is significantly attenuated over that of OS2 68, indicating a significant oxygen storage and release capacity of underfloor converter 16, providing for continued monitoring of underfloor converter 16 of FIG. 1 despite the presence of the PUP converter fault condition.

Figure 4A:
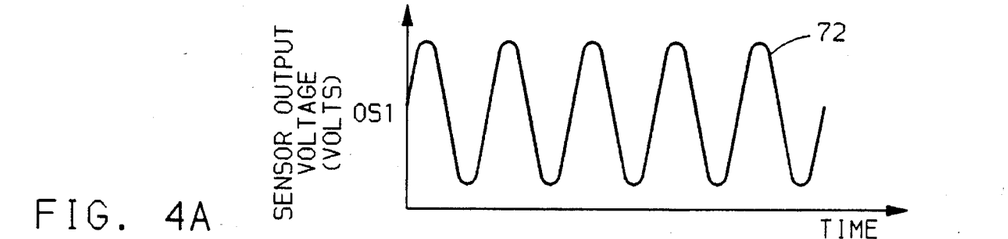
Figure 4B:
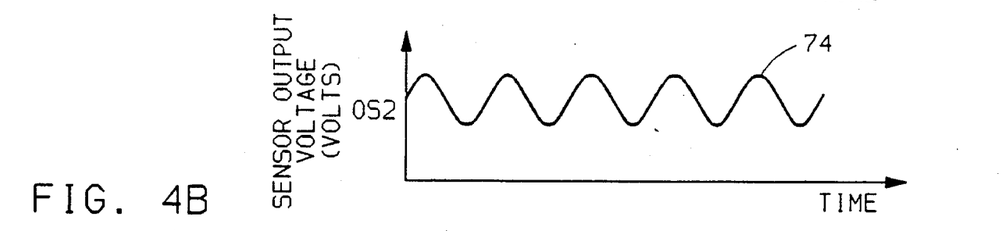
Figure 4C:
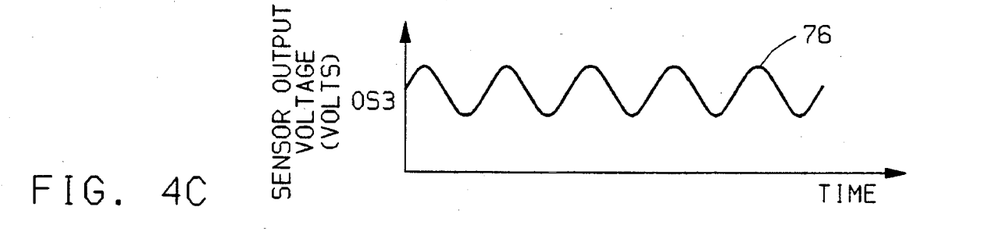

Turning to FIG. 4, signals OS1 72, OS2 74, and OS3 76 are provided corresponding to a substantially contemporaneous sampling period of sensors 22, 24, and 26, respectively, in a system having an underfloor converter 16 with a defect resulting in a depleted oxygen storage and release capacity, and having a PUP converter 14 with no such defect. As in the FIGS. 2 and 3, the signals illustrated in FIG. 4 correspond to oxygen sensor signals in a system in which signal OS2 is used for feedback information to indicate actual engine air/fuel ratio for closed-loop air/fuel ratio control. The oxygen storage and release capacity of the substantially defect-free PUP converter 14 results in a more slowly oscillating signal 74 than that illustrated by signal 68 of FIG. 3. The signal OS3 76 follows closely the peak to peak magnitude of signal OS2 74, wherein the small difference in magnitude between OS2 and OS3 would indicate the underfloor converter 16 fault condition in accord with this invention.

Figure 5A:
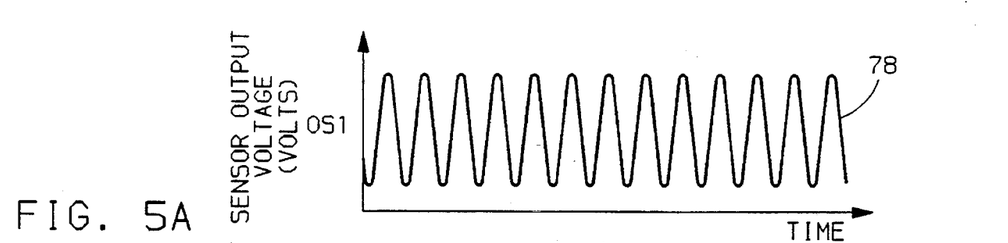
Figure 5B:
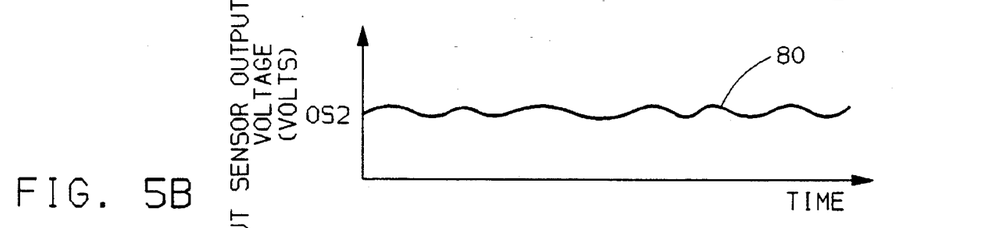
Figure 5C:
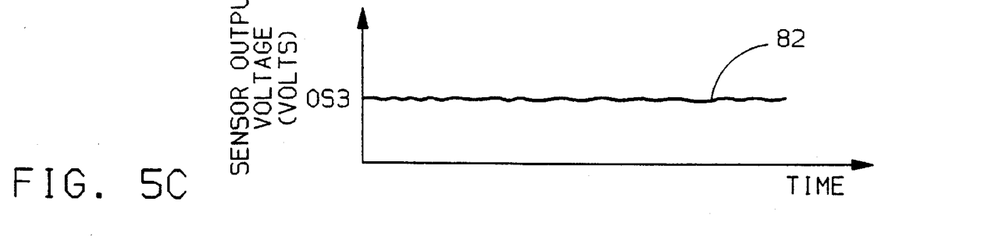

The oxygen sensor signals illustrated in FIGS. 2–4 correspond to a configuration of the preferred embodiment in which intermediate oxygen sensor 24 of FIG. 1 provides a signal used by engine controller 30 to provide closed-loop engine air/fuel ratio control. Using the intermediate sensor 24 provides for oscillation in the OS2 signal so that meaningful analysis of signals OS2 and OS3 may be made in accord with this invention for converter diagnostics. In the event signal OS1 from upstream oxygen sensor 22 were used as an actual engine air/fuel ratio measurement for engine air/fuel ratio control by controller 30, the signals of FIG. 5 would be available for control and diagnostics. For example, OS1 may be used for such air/fuel ratio control during engine operating periods in which converter diagnostics are not needed, such as both before and after carrying out a converter diagnostic operation. Signal OS1 78 of FIG. 5 is characterized by a high frequency, high amplitude oscillation between a rich and lean oxygen condition as the engine air/fuel ratio control responds to such oscillation and rapidly compensates for OS1 feedback to drive actual air/fuel ratio toward stoichiometry. The frequency of signal of OS1 78 on which the closed-loop engine air/fuel ratio is based, is substantially higher than the frequency of signals OS1 of FIGS. 2 and 4, as no feedback signal lag from converter oxygen storage and release activity is injected into the feedback signal to which the air/fuel ratio control is responsive. Accordingly, it is preferred that, when possible, oxygen sensor 22 in the upstream position in FIG. 1 be used for closed-loop engine air/fuel ratio control.

The intermediate oxygen sensor 24 would, in this embodiment, only be used during diagnostic periods in which the storage and release activity of both the PUP and the underfloor converters is monitored. However, in embodiments of this invention in which the PUP converter 14 is located so close to the engine 10 that there is insufficient room to properly place an oxygen sensor, such as oxygen sensor 22 of FIG. 1, in a position in which it can provide meaningful information on engine air/fuel ratio and still be upstream of the PUP converter 14, the intermediate sensor 24 may be used during operating periods beyond mere diagnostic periods for actual engine air/fuel ratio feedback information.

Returning to FIG. 5, signal OS2 80 indicates the output signal characteristic of oxygen sensor 24 in the intermediate position, in the configuration in which signal OS1 78 is used for closed-loop engine air/fuel ratio control. The signal OS2 80 is substantially attenuated due to the oxygen storage and release activity of the PUP converter 14. As the closed-loop air/fuel ratio control is responsive to the upstream sensor signal OS1 78 and not intermediate sensor signal OS2 80, no significant oscillation between rich and lean oxygen conditions is present in signal OS2 80, as the more responsive upstream sensor information, which is not subject to PUP converter lag effects, is used for air/fuel ratio compensation. The compensation can switch rapidly enough that the PUP capacity is not exceeded to the extent that any significant oscillation appears in the signal OS2 80.

Any slow variation in the voltage of OS2 80 that may appear is significantly attenuated by the activity of underfloor converter 16, such that signal OS3 82 appears as a substantially steady oxygen content value. In this configuration, the capacity of PUP converter 14 may easily be diagnosed through a comparison of the magnitude of signals 78 and 80 over a sampling period, but the capacity of underfloor converter 16 may not be diagnosed, as very little difference between signals 80 and 82 appears even for an underfloor converter of a significant oxygen storage capacity. Therefore, in the preferred approach to engine air/fuel ratio control in which upstream oxygen sensor 22 provides a feedback signal indicative of actual engine air/fuel ratio, the underfloor converter 16 may not be reliably monitored through the difference between oxygen sensor 24 output signal OS2 80 and downstream oxygen sensor 26 output signal OS3 82. Accordingly, in this embodiment, when a diagnosis of such underfloor converter 16 is to be made, control of engine air/fuel ratio is carried out using signal OS2 as the feedback signal indicating actual engine air/fuel ratio, which provides the information illustrated in FIGS. 2–4. This diagnostic configuration may be extended for use during any period of closed-loop engine air/fuel ratio beyond the diagnostic period, such as in embodiments of this invention in which the position of PUP converter 14 does not allow for proper placement of the upstream oxygen sensor 22 for reliable engine air/fuel ratio control based on the output signal OS1 therefrom.

Figure 6:
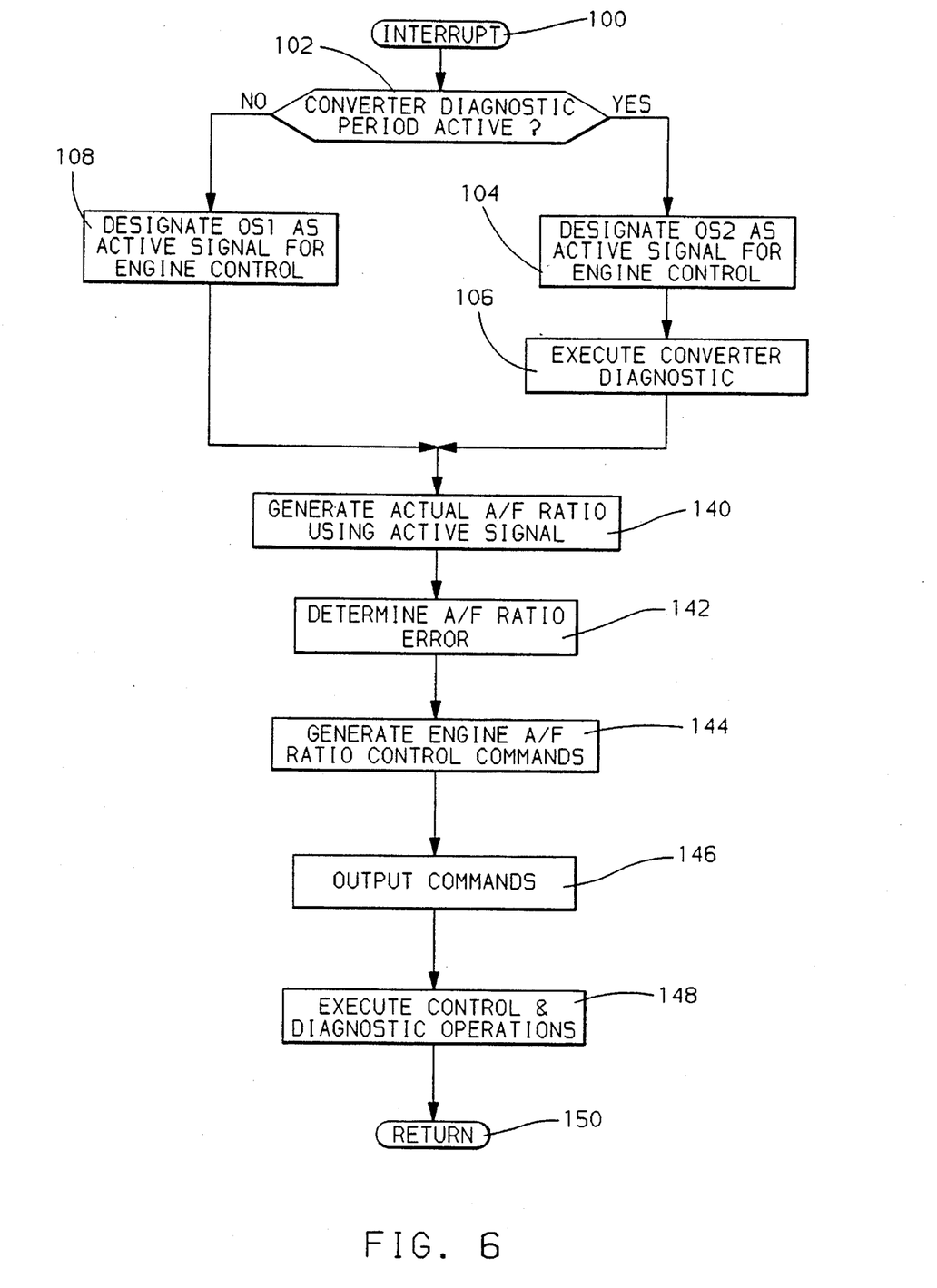
FIGS. 6 and 7 diagram a flow of operations for diagnosing the converters of FIG. 1.
Figure 7:
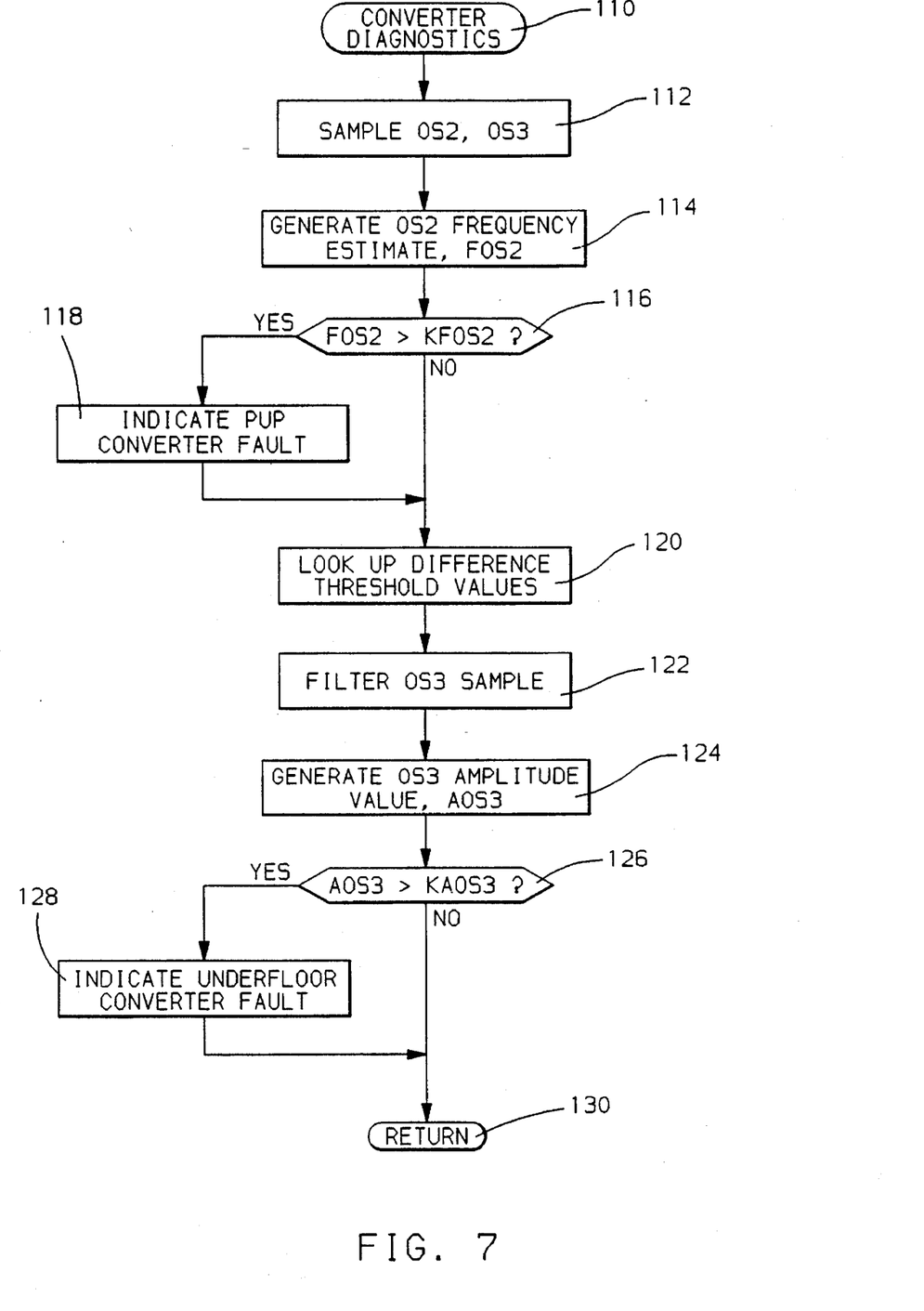

The operations of controller 30 of FIG. 1 in carrying out engine control and diagnostics in accord with the present embodiment is illustrated in FIGS. 6 and 7. The series of operations required to carry out such control and diagnostics may be embodied as a series of program steps sequentially executed by engine controller 30. For example, to carry out timed operations, the controller 30 may rely on a number of time-based and event-based interrupts which, upon their occurrence, redirect controller operations to dedicated interrupt service routines that carry out specific timed operations to provide for such control and diagnostics. For example, one such interrupt that occurs periodically, such as approximately every 100 milliseconds while the controller 30 is operating, may be serviced through the operations generally illustrated in FIG. 6, beginning upon occurrence of the interrupt at a step 100, and proceeding to a step 102 to determine if a converter diagnostic period is active. A converter diagnostic period may be activated a predetermined number of times for each vehicle operating cycle. For example, one such diagnostic period may occur following each startup of the engine. The period may be activated after a determination that the PUP and underfloor converter, as well as the three oxygen sensors are sufficiently elevated in temperature to become reliably operational, as is generally understood in the art. Following a complete diagnostic test in accord with this invention, the diagnostic period may be deactivated. The converter diagnostic period may be activated by setting, once per vehicle operating cycle, a flag in controller memory which may be read at the step 102 of FIG. 6 and, when set, the converter diagnostic carried out by proceeding to a step 104 to designate the intermediate oxygen sensor 24 of FIG. 1 having output signal OS2 as the active signal used in engine air/fuel ratio control. Such designation may be carried out by setting a flag in controller memory which is read in an air/fuel ratio control routine step to determine which of the oxygen sensors is to be used for engine air/fuel ratio control. After designating OS2 as the active signal, the routine proceeds to a step 106 to carry out a converter diagnostic routine, such as the routine illustrated in FIG. 7 of this embodiment. When executed at the step 106, the converter diagnostic routine is initiated at a step 110 and proceeds to a step 112 to sample the value of oxygen sensor signals OS2 and OS3.

The routine next generates a frequency value FOS2 representing the frequency of oscillation of signal OS2 at a step 114. FOS2 may be generated through a simple analysis of a number of OS2 signal samples taken at successive iterations of the step 114 through which a determination of the frequency of occurrence of voltage peaks of signal OS2 can be made. The frequency of occurrence of recent OS2 peak values can be used to establish FOS2. As described, FOS2 indicates the oxygen storage capacity of the PUP converter 14 of FIG. 1, as the frequency varies with the converter oxygen storage capacity. For example, as the converter loses its oxygen storage capacity, the lag introduced into the oxygen sensor feedback signal by the oxygen storage and release activity is reduced, and the oscillation frequency increases from an initial value, such as the frequency of the signal OS2 62 of FIG. 2 to the frequency of signal OS2 68 of FIG. 3.

The frequency FOS2 is next compared to a predetermined threshold frequency KFOS2, referenced from controller memory, at a step 116. KFOS2 may be determined through a conventional calibration process using an inert PUP converter in the exhaust system in place of converter 14, and selecting a frequency value slightly lower than that of the sensor signal OS2 when such sensor signal is used for closed-loop engine air/fuel ratio control. For example, by dividing the sensor signal OS2 frequency under such calibration conditions by a factor 1.1, the frequency KFOS2 may be established. If frequency FOS2 is greater than KFOS2 at the step 116, a deteriorated PUP converter is assumed to be present, and the routine moves to indicate the diagnosis at a step 118, such as by setting a PUP converter fault code in controller nonvolatile memory, and by energizing indicator 36 of FIG. 1.

After indicating the diagnosis at the step 118, or if no fault was assumed to be present at the step 116, the routine proceeds to analyze the capacity of the underfloor converter 16 (FIG. 1) via the steps 120–124. First, an OS3 amplitude value AOS3 is generated at a step 120 as a value representing the current magnitude of signal OS3. For example, AOS3 may be generated by taking a number of OS3 signal samples over a sampling interval, determining the deviation of each of the samples away from some predetermined fixed voltage level, and then generating a single value AOS3 representing the typical OS3 deviation over the sampling interval, such as by generating an average.

The value AOS3 is next compared to a predetermined threshold value KAOS3 at a step 122, wherein the threshold value is referenced from controller memory. KAOS3 may be established during a conventional calibration process, wherein an inert underfloor converter is substituted into the exhaust gas treatment system of FIG. 1 as converter 16, and measurements of the amplitude of the oxygen sensor output signal OS3 are made while signal OS2 is used for closed-loop engine air/fuel ratio control. The measurements of OS3 amplitude indicate the typical signal amplitude of a failed underfloor converter. A representative deviation of such measurements away from a predetermined fixed voltage level, such as the level described for determination of the value AOS3 at the step 120, is made during the calibration process, and the representative deviation divided by a predetermined factor, such as about 1.1, to establish the difference threshold KAOS3.

If AOS3 exceeds KAOS3 at the step 122, an underfloor converter fault is assumed to be present, as the degree of attenuation of the signal OS3 provided by the oxygen storage and release activity of the underfloor converter 16 (FIG. 1) substantially matches that of OS3 provided by a known inert underfloor converter. When such a fault is assumed to be present, an indication is made of such fault at a step 124, such as by storing an underfloor converter fault code in controller non-volatile memory and by energizing indicator 36 of FIG. 1. Next, or if no such fault was diagnosed at the step 122, the routine returns, via a step 126, to execute the step 140 of FIG. 6.

After executing the converter diagnostic of FIG. 7 at the step 106, the routine of FIG. 6 proceeds to a step 140 to generate an actual engine air/fuel ratio using the active signal, which is the signal OS2 from sensor 24 while the converter diagnostic is active and in other embodiments of this invention, such as in systems in which the PUP converter of FIG. 1 does not allow for proper positioning of the upstream sensor 22, and which is the signal OS1 when the diagnostic is not active. The actual air/fuel ratio generation at the step 140 may be carried out using any conventional interpretation of oxygen sensor values as is generally understood in the art. The routine next proceeds to a step 142 to determine an air/fuel ratio error which generally may be described as the difference between the actual air/fuel ratio derived at the step 140 and a desired air/fuel ratio such as the stoichiometric air/fuel ratio. This air/fuel ratio error may be applied to a control function such as a proportional-integral-derivative control function which is provided with proportional, integral, and derivative gains established to drive such error toward zero. Such control function may generate at the step 144 appropriate air/fuel ratio control commands, such as adjustments to the FUELCMD applied to fuel control unit 32 of FIG. 1 in the form of fuel pulse width adjustments, or appropriate adjustments to the AIRCMD applied to the air control unit 34 of FIG. 1.

After generating such engine air/fuel ratio control commands responsive to the conventional closed-loop engine air/fuel ratio control function of the present embodiment, the routine proceeds to a step 146 to output the control commands to the appropriate actuators, and then proceeds to a step 148 to execute any other control and diagnostic operations that may be preferably carried out during the present interrupt service routine. Such control and diagnostic operations may provide for other engine control functions including ignition control functions and any diagnostic operations beyond the catalytic converter diagnostic operations of the present embodiment as is generally understood in the art. After completing such control and diagnostic operations at the step 148, the routine proceeds to a step 150 to return to any operations that were ongoing prior to the time of the interrupt that initiated the routine if FIG. 6 occurred.

The preferred embodiment for illustrating this invention is not to be taken as limiting or restricting this invention since many modifications may be made through the exercise of ordinary skill in the art without departing from the scope of this invention.

The embodiments of the invention in which a property or privilege is claimed are described as follows:

1. An engine control and diagnostic method for varying the source of an actual air/fuel ratio feedback signal in an automotive internal combustion engine having an exhaust system including at least an upstream and a downstream catalytic treatment device for catalytically treating engine exhaust gas passing therethrough, comprising the steps of:

during a diagnostic period, sensing a treated oxygen content of exhaust gas after such exhaust gas has been catalytically treated by the upstream catalytic treatment device;

during engine operating periods other than the diagnostic period, sensing a substantially untreated oxygen content of engine exhaust gas prior to such exhaust gas being catalytically treated by at least the upstream and downstream catalytic treatment devices;

controlling engine air/fuel ratio in response to the sensed treated oxygen content during the diagnostic period; and controlling engine air/fuel ratio in response to the sensed substantially untreated oxygen content during engine operating periods other than the diagnostic period.

2. The method of claim 1, further comprising the steps of:

generating a value representing an estimated oxygen storage capacity of the upstream catalytic treatment device as a predetermined function of the sensed treated oxygen content;

determining when the generated value indicates an oxygen storage capacity that is below a predetermined threshold oxygen storage capacity; and indicating a reduced oxygen storage capacity in the upstream catalytic treatment device when the generated value indicates an oxygen storage capacity that is below the predetermined threshold oxygen storage capacity.

3. The method of claim 1, further comprising the steps of:

generating a value representing a frequency of variation in the sensed treated oxygen content;

comparing the generated value to a predetermined frequency threshold value; and indicating an upstream catalytic treatment device fault condition when the generated value exceeds the threshold value.

4. The method of claim 1, further comprising the steps of:

during the diagnostic period, sensing downstream oxygen content of engine exhaust gas after such engine exhaust gas has been catalytically treated by the downstream catalytic treatment device;

generating a value representing an oxygen storage capacity of the downstream catalytic treatment device as a predetermined function of the sensed downstream oxygen content;

determining when the generated value indicates an oxygen storage capacity that is below a predetermined threshold oxygen storage capacity; and indicating a low capacity downstream catalytic treatment device when the generated value indicates an oxygen storage capacity that is below the threshold oxygen storage capacity.

5. The method of claim 1, further comprising the steps of:

during the diagnostic period, generating a signal representing downstream oxygen content of engine exhaust gas after such engine exhaust gas has been catalytically treated by the downstream catalytic treatment device;

generating an amplitude value representing the amplitude of the generated signal;

comparing the amplitude value to a predetermined amplitude threshold value; and indicating a low capacity downstream catalytic treatment device when the amplitude value is less than the predetermined amplitude threshold value.

6. The method of claim 1, wherein the first recited controlling step further comprises the steps of:

generating an actual engine air/fuel ratio value as a predetermined function of the sensed treated oxygen content;

referencing a predetermined desired engine air/fuel ratio;

calculating a difference value representing a deviation of the actual engine air/fuel ratio away from the desired engine air/fuel ratio;

determining a control command for controlling at least one of engine inlet air and engine inlet fuel as a predetermined function of the calculated difference; and issuing the control command to a corresponding actuator for controlling the at least one of engine inlet air and engine inlet fuel.

7. The method of claim 1, wherein the second recited controlling step further comprises the steps of:

generating an actual engine air/fuel ratio value as a predetermined function of the sensed substantially untreated oxygen content;

referencing a predetermined desired engine air/fuel ratio;

calculating a difference value representing a deviation of the actual engine air/fuel ratio away from the desired engine air/fuel ratio;

determining a control command for controlling at least one of engine inlet air and engine inlet fuel as a predetermined function of the calculated difference; and issuing the control command to a corresponding actuator for controlling the at least one of engine inlet air and engine inlet fuel.

8. An engine control and diagnostic method for an internal combustion engine from which exhaust gas exits into an exhaust gas flow path which includes an upstream and a downstream catalytic treatment device, wherein the engine exhaust gas passes from the engine, through the upstream catalytic treatment device and then through the downstream catalytic treatment device, comprising the steps of:

sensing an upstream oxygen content of engine exhaust gas passing between the engine and the upstream catalytic treatment device;

sensing an intermediate oxygen content of engine exhaust gas passing between the upstream and downstream catalytic treatment devices;

sensing a downstream oxygen content of engine exhaust gas after such exhaust gas exits the downstream catalytic treatment device;

during a predetermined diagnostic period, to allow for upstream and downstream catalytic treatment device diagnostics, deriving a value representing actual engine air/fuel ratio as a predetermined function of the sensed intermediate oxygen content;

during periods other than the predetermined diagnostic period, deriving a value representing actual engine air/fuel ratio as a predetermined function of the sensed upstream oxygen content; and controlling engine air/fuel ratio so as to drive the derived actual air/fuel ratio toward a predetermined desired air/fuel ratio.

9. The method of claim 8, further comprising the steps of:

during the predetermined test period, estimating the oxygen storage capacity of the upstream catalytic treatment device;

determining when the estimated oxygen storage capacity is below a predetermined threshold capacity; and indicating a fault condition when the estimated oxygen storage capacity is determined to be below the predetermined threshold capacity.

10. The method of claim 8, further comprising the steps of:

during the predetermined test period, estimating the oxygen storage capacity of the downstream catalytic treatment device;

determining when the estimated oxygen storage capacity is below a predetermined threshold capacity; and indicating a fault condition when the estimated oxygen storage capacity is determined to be below the predetermined threshold capacity.

11. The method of claim 8, further comprising the steps of:

during the predetermined diagnostic period, generating an amplitude value representing the approximate amplitude of the sensed downstream oxygen content;

comparing the amplitude value to a predetermined amplitude threshold value; and diagnosing a fault condition in the downstream catalytic treatment device when the amplitude value exceeds the amplitude threshold value.

12. The method of claim 8, further comprising the steps of:

during the predetermined diagnostic period, generating a frequency value representing the approximate frequency of the sensed intermediate oxygen content;

comparing the frequency value to a predetermined frequency threshold value; and diagnosing a fault condition in the upstream catalytic treatment device when the frequency value exceeds the frequency threshold value.

13. An engine control system for controlling internal combustion engine air/fuel ratio and for diagnosing fault conditions in at least two catalytic treatment devices in a flow path in which internal combustion engine exhaust gas flows from the engine through a first catalytic treatment device and then through a second catalytic treatment device, comprising:

an upstream sensor positioned in the flow path to sense an upstream oxygen content of exhaust gas passing between the engine and first catalytic treatment device;

an intermediate sensor positioned in the flow path to sense and output a signal indicating an intermediate oxygen content of exhaust gas passing between the first and second catalytic treatment devices;

a downstream sensor positioned in the flow path to sense and output a signal indicating a downstream oxygen content of exhaust gas passing between the second catalytic treatment device and the atmosphere;

a controller responsive to an input signal indicating actual engine air/fuel ratio to control at least a predetermined one of engine inlet air and engine inlet fuel to the engine to drive the actual engine air/fuel ratio toward a desired air/fuel ratio, wherein the input signal corresponds to the output signal from the intermediate sensor during a predetermined test period, and wherein the input signal otherwise corresponds to the output signal from the upstream sensor; and a diagnostic device which receives the output signal from at least the intermediate and downstream sensors for diagnosing fault conditions in the first and second catalytic treatment devices.

* * * * *